United States Patent
Huang et al.

(10) Patent No.: US 9,359,210 B2
(45) Date of Patent: Jun. 7, 2016

(54) METHOD FOR MANUFACTURING A GRAPHENE LAYER

(71) Applicant: METAL INDUSTRIES RESEARCH & DEVELOPMENT CENTRE, Kaohsiung (TW)

(72) Inventors: Chia-Hung Huang, Kaohsiung (TW); Sung-Mao Chiu, Pingtung County (TW); Chung-Jen Chung, Tainan (TW); Bo-Hsiung Wu, Tainan (TW)

(73) Assignee: METAL INDUSTRIES RESEARCH & DEVELOPMENT CENTRE, Kaohsiung (TW)

(*) Notice: Subject to any disclaimer, the term of this patent is extended or adjusted under 35 U.S.C. 154(b) by 357 days.

(21) Appl. No.: 13/939,412

(22) Filed: Jul. 11, 2013

(65) Prior Publication Data
US 2014/0311894 A1    Oct. 23, 2014

(30) Foreign Application Priority Data
Apr. 22, 2013    (TW) ............................... 102114278 A

(51) Int. Cl.
  *C01B 31/04*    (2006.01)
(52) U.S. Cl.
  CPC .................................. *C01B 31/0446* (2013.01)
(58) Field of Classification Search
  CPC .. C01B 31/04; C01B 31/0438; C01B 31/0446
  USPC ..................................................... 204/192.34
  See application file for complete search history.

(56) References Cited

U.S. PATENT DOCUMENTS

| | | | | |
|---|---|---|---|---|
| 3,869,894 A | * | 3/1975 | Meyer ..................... | C23C 22/73 148/253 |
| 4,157,941 A | * | 6/1979 | Donakowski ............ | C23G 1/22 205/176 |
| 6,159,558 A | * | 12/2000 | Wolfe ................. | C23C 14/5826 204/192.1 |
| 6,753,042 B1 | * | 6/2004 | Plotnikov .............. | C23C 14/025 427/131 |
| 8,580,658 B1 | * | 11/2013 | Davis .................. | H01L 21/0237 257/9 |

FOREIGN PATENT DOCUMENTS

| | | |
|---|---|---|
| CN | 102344132 A | 2/2012 |
| CN | 102583345 A | 7/2012 |
| JP | 2008-235520 | * 10/2008 |

OTHER PUBLICATIONS

Machine Translation of JP 2008-235520 dated Oct. 2008.*
Taiwanese Office Action mailed Oct. 17, 2014 for Taiwanese Patent Application No. 102114278, 4 pages.
Chinese Office Action mailed Feb. 1, 2016 for Chinese Patent Application No. 201310541119.5, 6 pages.

* cited by examiner

*Primary Examiner* — Rodney McDonald
(74) *Attorney, Agent, or Firm* — Jackson IPG PLLC; Demian K. Jackson

(57) ABSTRACT

A method for manufacturing a graphene layer includes performing a sputtering process to form a graphite layer on a substrate, and performing a lithography process on the graphite layer for thinning the graphite layer and thereafter making the graphite layer thinned to become a graphene layer.

8 Claims, 12 Drawing Sheets

METHOD FOR MANUFACTURING A GRAPHENE LAYER

FIELD OF THE INVENTION

The present invention is generally related to a method for manufacturing a graphene layer, which particularly relates to the method for manufacturing the graphene layer under low temperature process.

BACKGROUND OF THE INVENTION

A graphene is composed of plural carbon atoms arranged in regular hexagonal pattern. The thickness of single-layered graphene is approximately 0.34 nm. Except single-layered graphene, dual-layered or multi-layered graphene material enables to be classified as graphene as well. The graphene is widely applicable to electronic devices, superconductive materials, photo-electronic materials, heat dissipation materials or energy materials (such as fuel cell).

A conventional method for manufacturing a graphene includes CVD method (e.g. normal pressure CVD or low pressure CVD) and chemical method (e.g. ultrasonic method or electro-chemical method). However, the process of mentioned methods necessarily proceeds under high temperature (higher than 1000 degrees) environment by means of catalyst (accelerator) and requires long preparation time. In this condition, the substrate with lower melting point will be melted or deformed. Besides, for a corrosive utilized in stripping graphene is a damaging pollutant, the corrosive must be treated prior to discharging so as to meet water discharge standards. Accordingly, the manufacturing procedures and manufacturing costs will be unavoidably increased.

SUMMARY

The primary object of the present invention is to provide a method for manufacturing a graphene layer by means of sputtering process.

The method for manufacturing a graphene layer of the present invention includes performing a sputtering process to form a graphite layer on a substrate, and performing a lithography process on the graphite layer for thinning the graphite layer and thereafter making the graphite layer thinned to become a graphene layer.

For the reason that the sputtering process is a low-temperature process (not larger than 250 degrees) and is not a chemical reaction process, the time for producing the graphene layer is shortened, and the use of catalyst (accelerator) and corrosive can be ignored. Therefore, the procedures and the manufacturing costs can be effectively reduced.

DETAILED DESCRIPTION OF THE INVENTION

Figure 1:
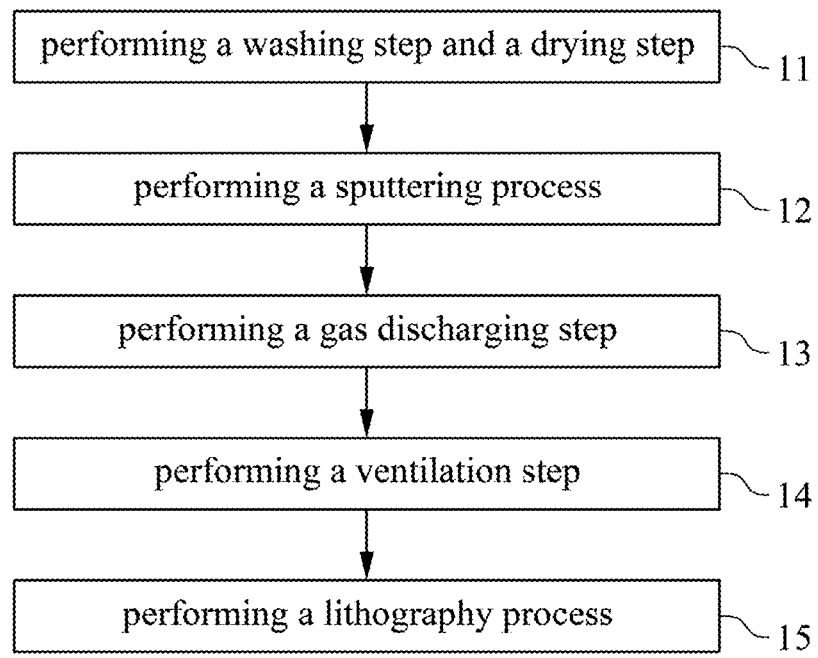
FIG. 1 is a flow chart illustrating a method for manufacturing a graphene layer in accordance with an embodiment of the present invention.

With reference to FIG. 1, a method for manufacturing a graphene layer in accordance with an embodiment of the present invention includes the following steps described as followed: performing a sputtering process to form a graphite layer on a substrate, and performing a lithography process on the graphite layer for thinning the graphite layer and thereafter making the graphite layer thinned to become a graphene layer. First, referring to step 11 of FIG. 1, performing a washing step and a drying step, in this embodiment, the washing step includes providing an ultrasonic oscillation alkaline-water bath, heating the ultrasonic oscillation alkaline-water bath and thereafter making the substrate disposed into the ultrasonic oscillation alkaline-water bath, wherein the heating temperature of the ultrasonic oscillation alkaline-water bath is not less than 100 Celsius degrees, and the time for the substrate to place in the ultrasonic oscillation alkaline-water bath is not less than one hour. The ultrasonic oscillation alkaline-water bath is composed of sodium hydroxide, hydrogen peroxide and ionized water, wherein their mixing ratio is 1:1:5. Next, performing the drying step after the washing step is performed, the drying step includes removing the substrate from the ultrasonic oscillation alkaline-water bath, placing the substrate into an oven and baking the substrate for 30 minutes.

Afterwards, referring to step 12 of FIG. 1, performing the sputtering process, wherein a graphite target and the substrate are disposed in a vacuum cavity of a sputter, and a reactive gas is provided within the vacuum cavity so as to perform the sputtering process. The sputtering process is to utilize the reactive gas to collide with the graphite target therefore generating plural carbon atoms, wherein the carbon atoms adhere to a surface of the substrate to form a graphite layer. In this embodiment, the process pressure ranges from $10^{-2}$ to $10^{-4}$ Torr, the flow rate of the reactive gas ranges from 5 to 20 SCCM, the sputtering time ranges from 0.1 to 5 minutes, and the reactive gas is selectable from one of argon gas, nitrogen gas or acetylene. In this embodiment, the process temperature in the sputtering process is not larger than 250 degrees.

After that, with reference to step 13 of FIG. 1, performing a gas discharging step, wherein the gas discharging step is to discharge the excessive reactive gas outwardly from the vacuum cavity.

Next, with reference to step 14 of FIG. 1, performing a ventilation step, wherein the ventilation step is to ventilate an argon gas into the vacuum cavity for protection of the graphite layer.

Eventually, with reference to step 15 of FIG. 1, performing the lithography process for thinning the graphite layer and making the graphite layer thinned to become the graphene layer, wherein the graphite layer is formed on the substrate. In this embodiment, the graphite layer is thinned by an ion source in the lithography process to make part of the graphite layer stripped from the graphite layer so as to make the graphite layer thinned to become the graphene layer. The characteristics of the ion source for thinning the graphite layer are described as followed: the voltage of the ion source ranges from 0.5 to 1.2 KV, the illuminating time ranges from 2 to 7 minutes, and the gas flow rate ranges from 20 to 35 SCCM. For the sputtering process is a low-temperature process (not larger than 250 degrees) and is not a chemical reaction process, the manufacturing time is effectively shortened, and there is no need to use catalyst (accelerator) and corrosive. Therefore, the manufacturing procedures and the manufacturing costs can be effectively reduced.

Figure 2:
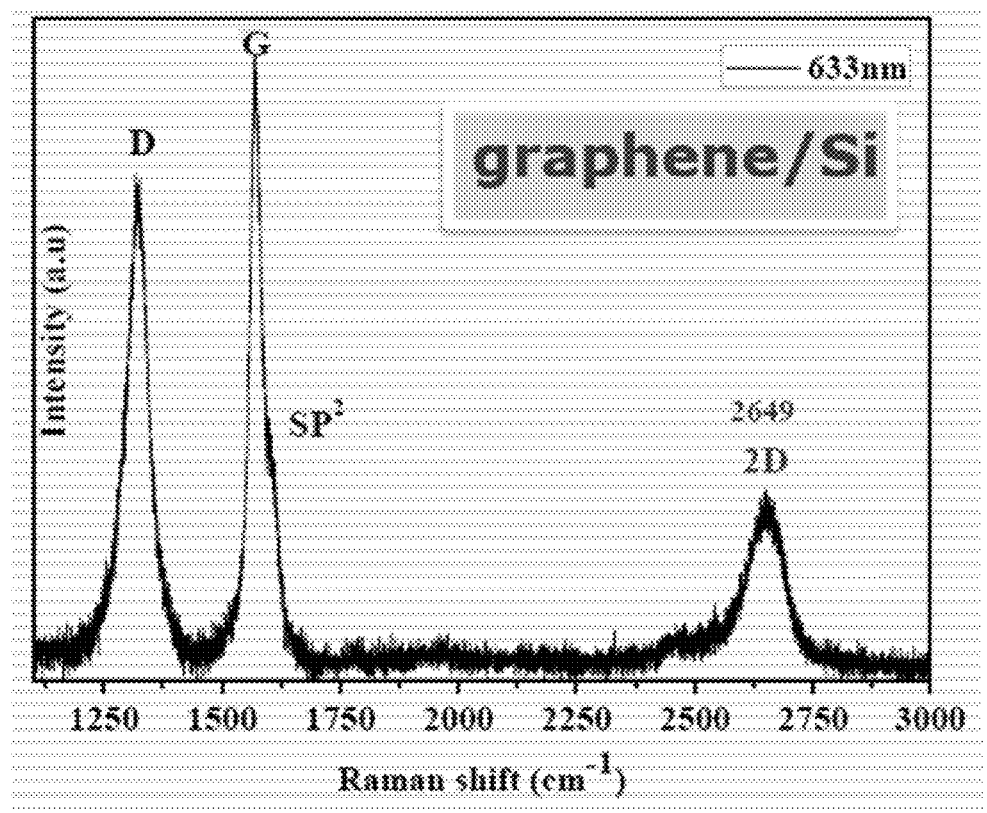
FIG. 2 is an analysis diagram of the graphene layer analyzed by Raman spectrum in accordance with the embodiment of the present invention.
Figure 3:
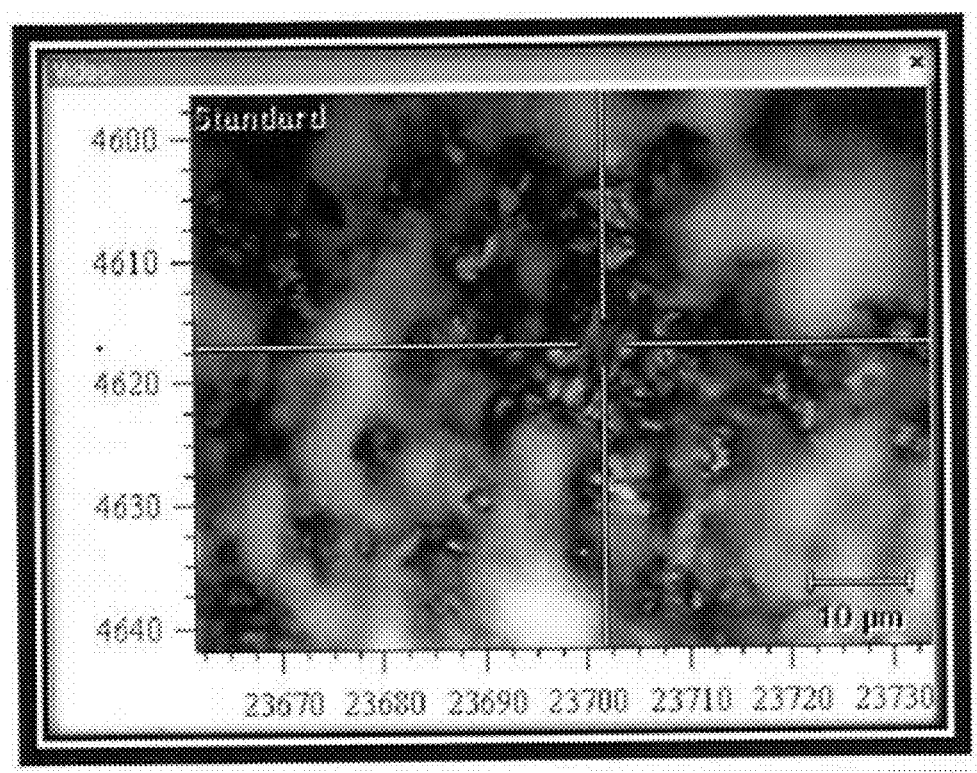
FIG. 3 is a photo illustrating the graphene layer analyzed by Raman spectrum in accordance with the embodiment of the present invention.
Figure 4:
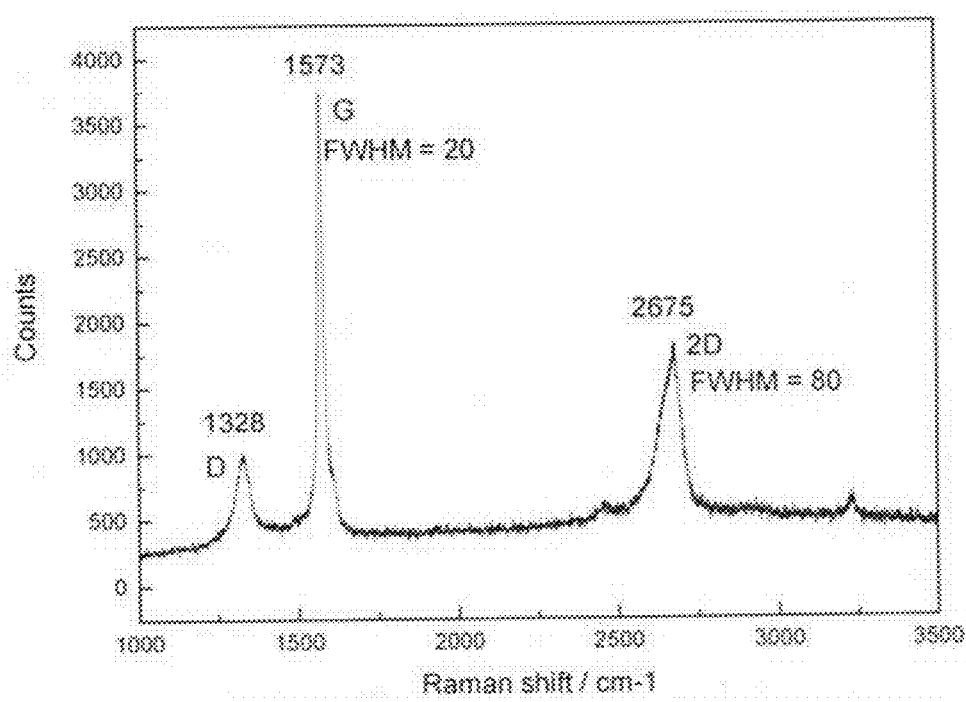
FIG. 4 is an analysis diagram of FIG. 3.
Figure 5A:
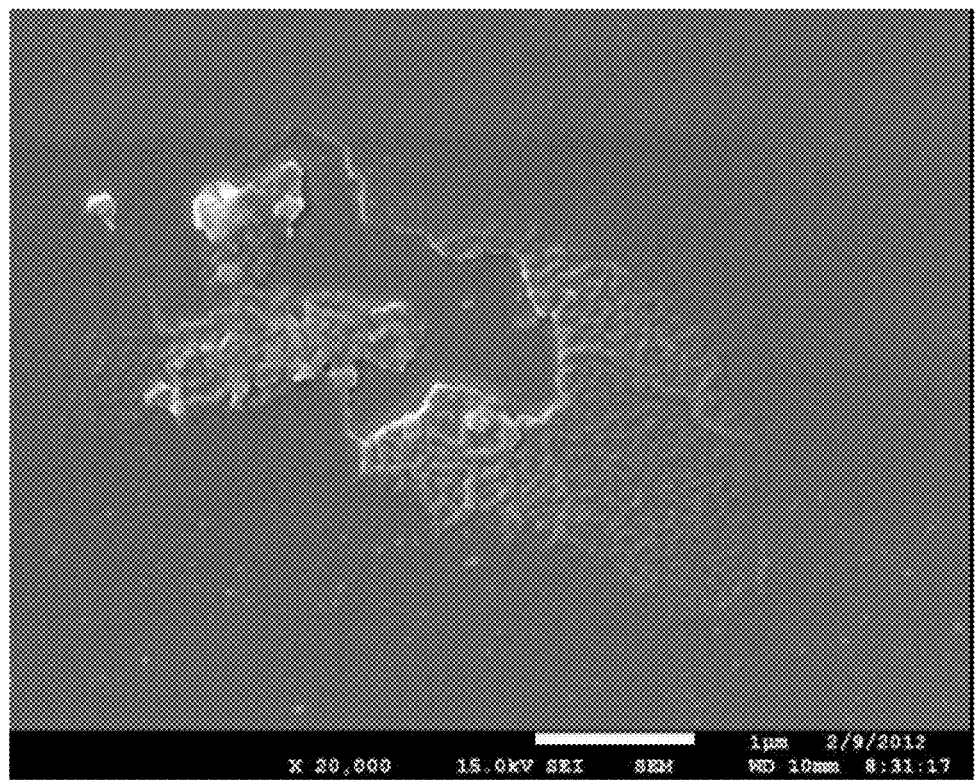
FIGS. 5A to 5E are photos illustrating the graphene layer analyzed by Field-Emission Scanning Electron Microscope in accordance with the embodiment of the present invention.
Figure 5B:
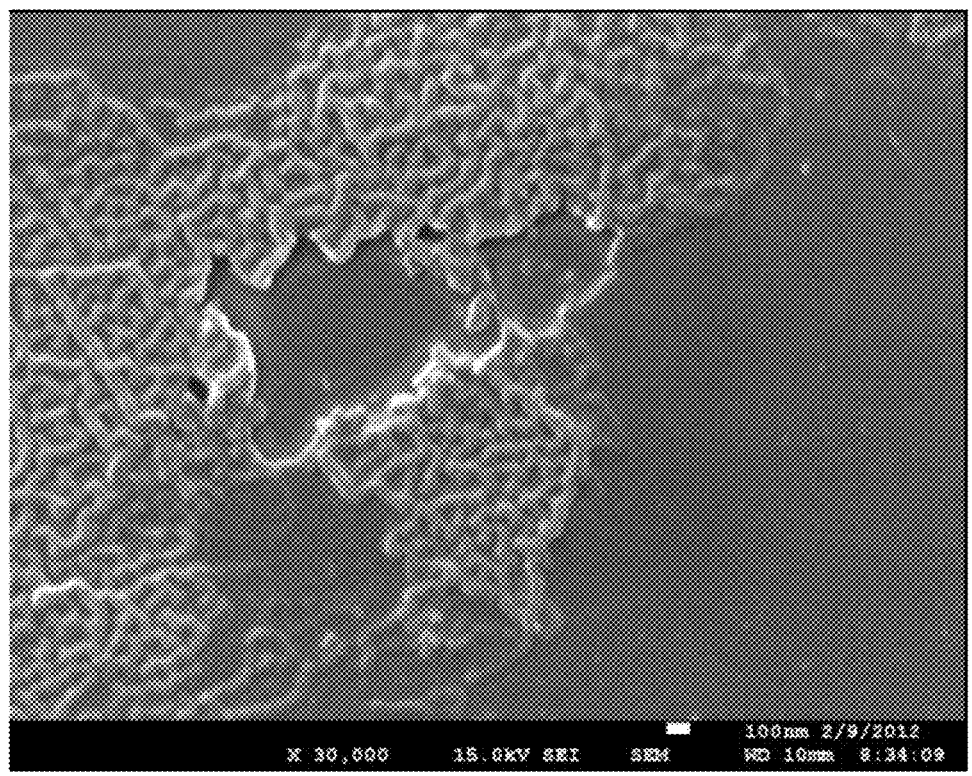
Figure 5C:
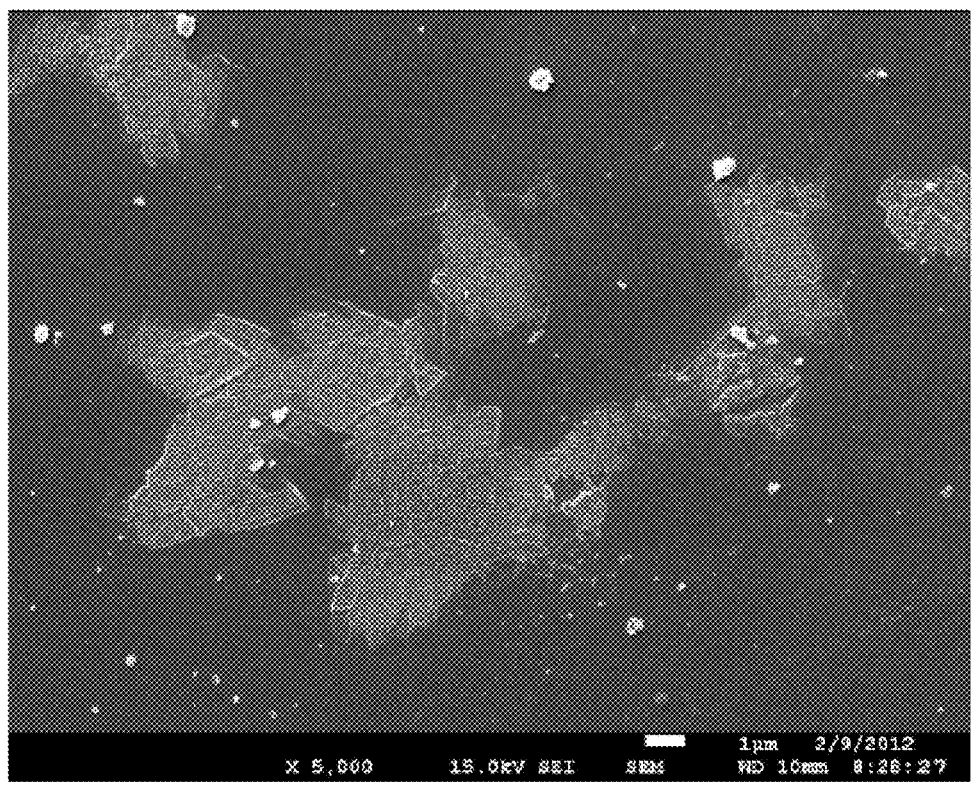
Figure 5D:
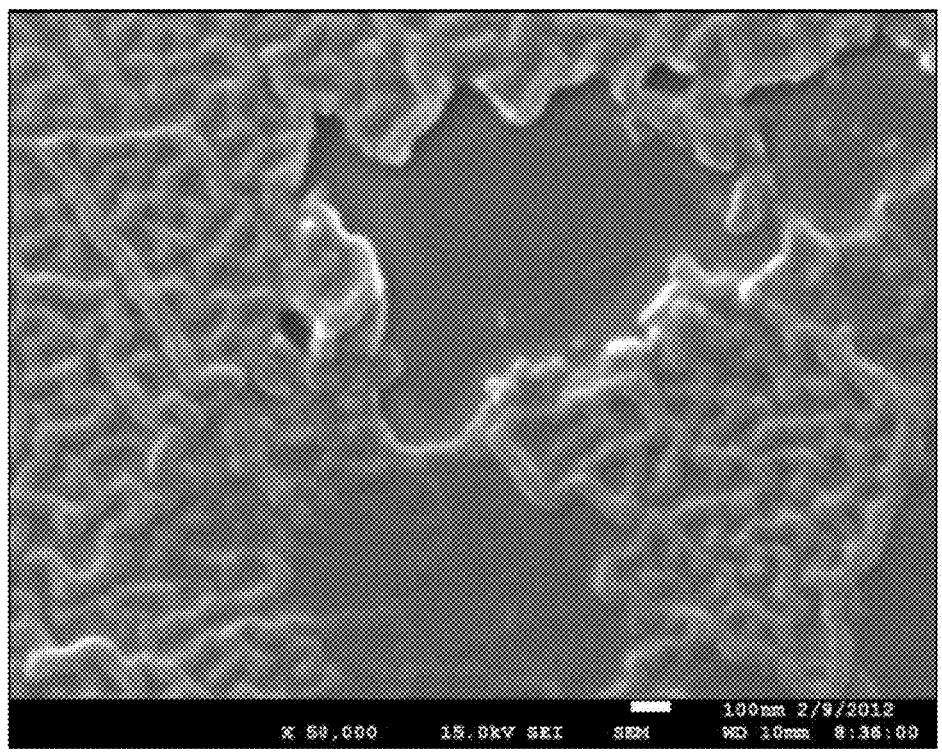
Figure 5E:
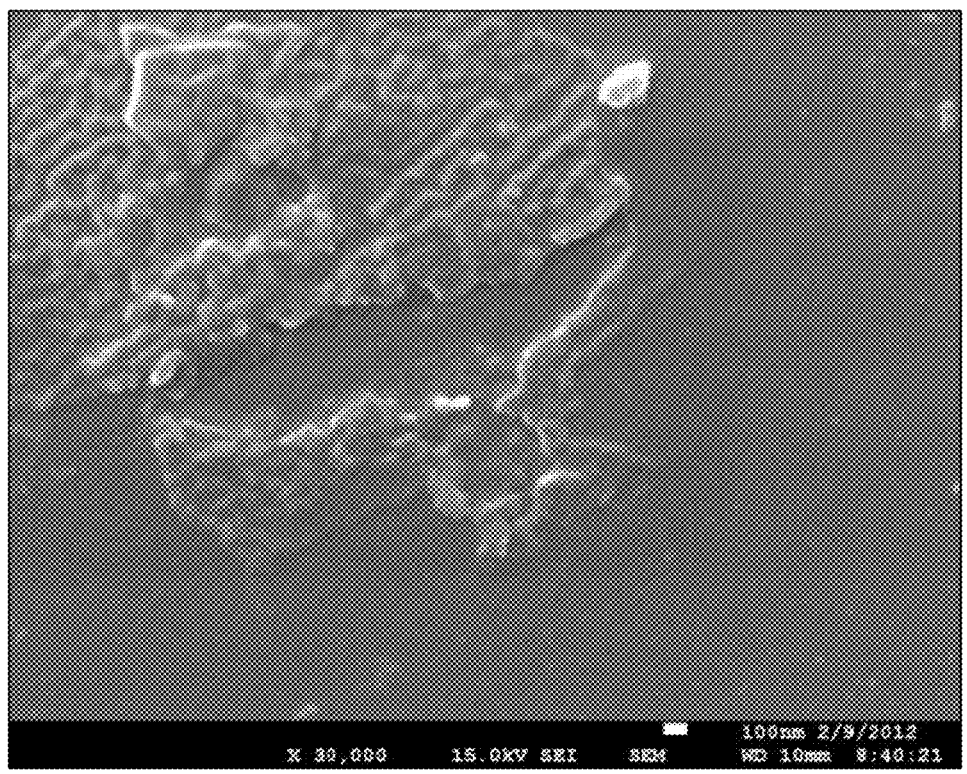

Referring to FIG. 2, the made-up article of the graphene layer manufactured by method of the present invention is analyzed by Raman spectrum analysis. By adopting Raman spectrum analysis, it is verified that the made-up article manufactured by method of the present invention is a graphene layer. With reference to FIG. 3, mentioned FIG. 3 is the photo of the made-up article manufactured by method of the present invention through analyze of Raman spectrum analysis, wherein FIG. 4 is the analysis diagram of FIG. 3. Several characteristic waves may be acquired in conventional Raman spectrum analysis, wherein one of the wave number is at 1328 cm$^{-1}$ named D band represented as sp$^3$ carbon configuration, which is an amorphous carbon-bonded structure, and another one of the wave number is at 1573 cm$^{-1}$ named G band, and the other one of the wave number is at 2675 cm$^{-1}$ named 2D band. In FIG. 4, it is realized that the made-up article manufactured by method of the present invention possesses fewer defects in sp$^3$ carbon configuration, and the made-up article also possesses thinner layered structure (observable by using 2D band) comparing with other made-up articles manufactured by methods differed from the method of the present invention. Therefore, the made-up article manufactured by method of the present invention is more advantageous than other ones manufactured by other methods.

In addition, FIGS. 5A to 5E are photos illustrating the made-up articles of the graphene layer manufactured by method of the present invention through analyze of Field-Emission Scanning Electron Microscope. By adopting the method for manufacturing the graphene layer of the present invention, it is realized that the graphene layer is able to be formed on the substrate without the use of catalyst or activator therefore achieving cost saving and procedure reduction.

Figure 6:
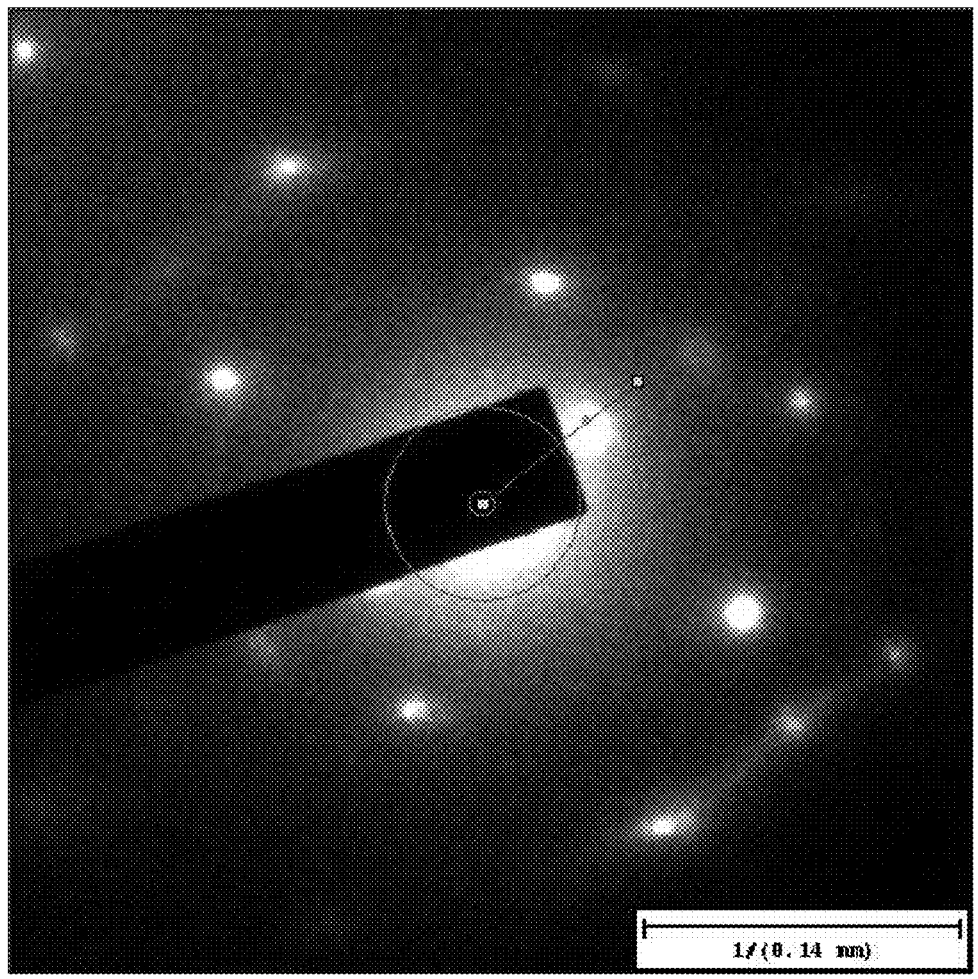
FIG. 6 is a photo illustrating the graphene layer analyzed by Transmission Electron Microscope in accordance with the embodiment of the present invention.
Figure 7:
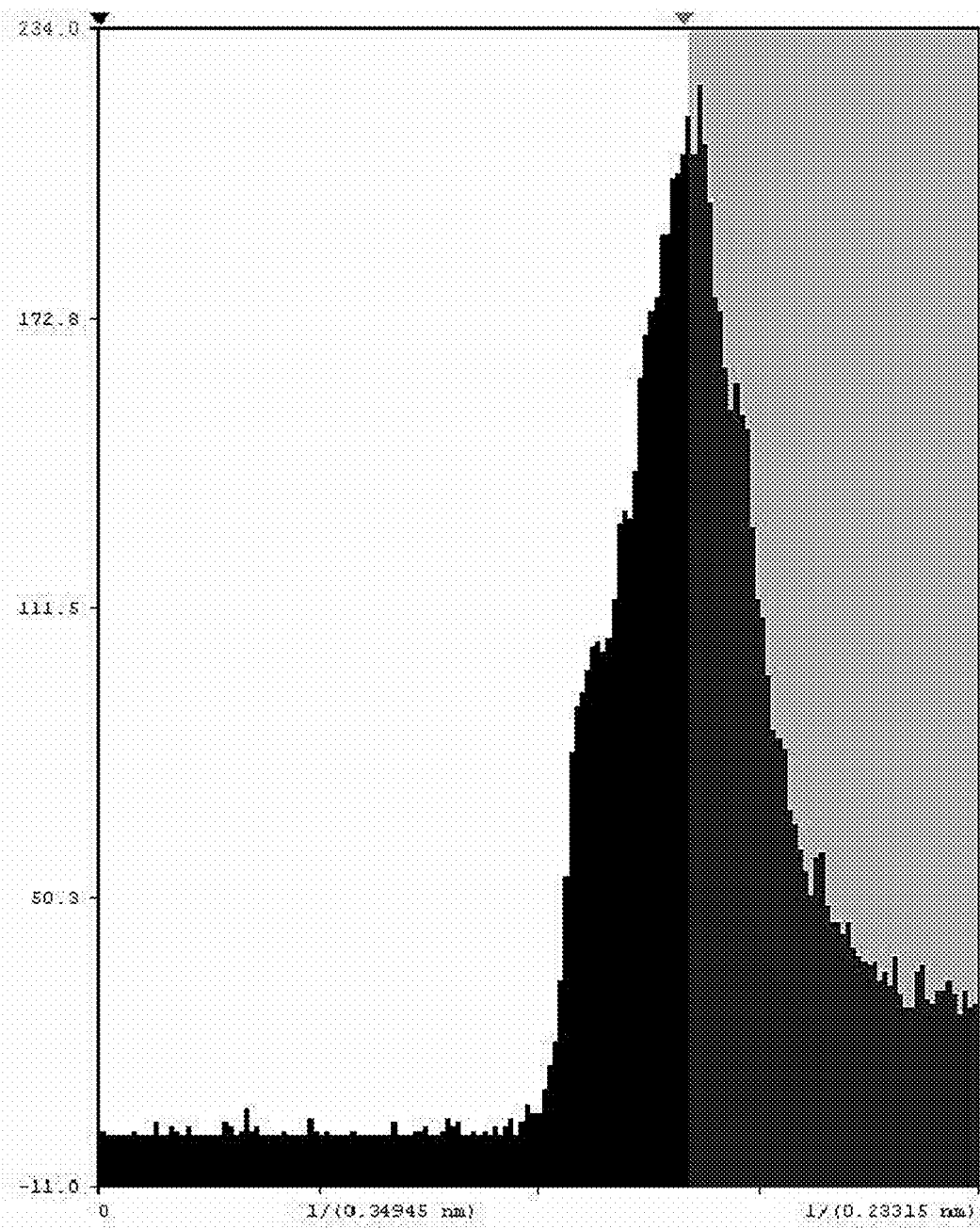
FIG. 7 is an analysis diagram of FIG. 6.
Figure 8:
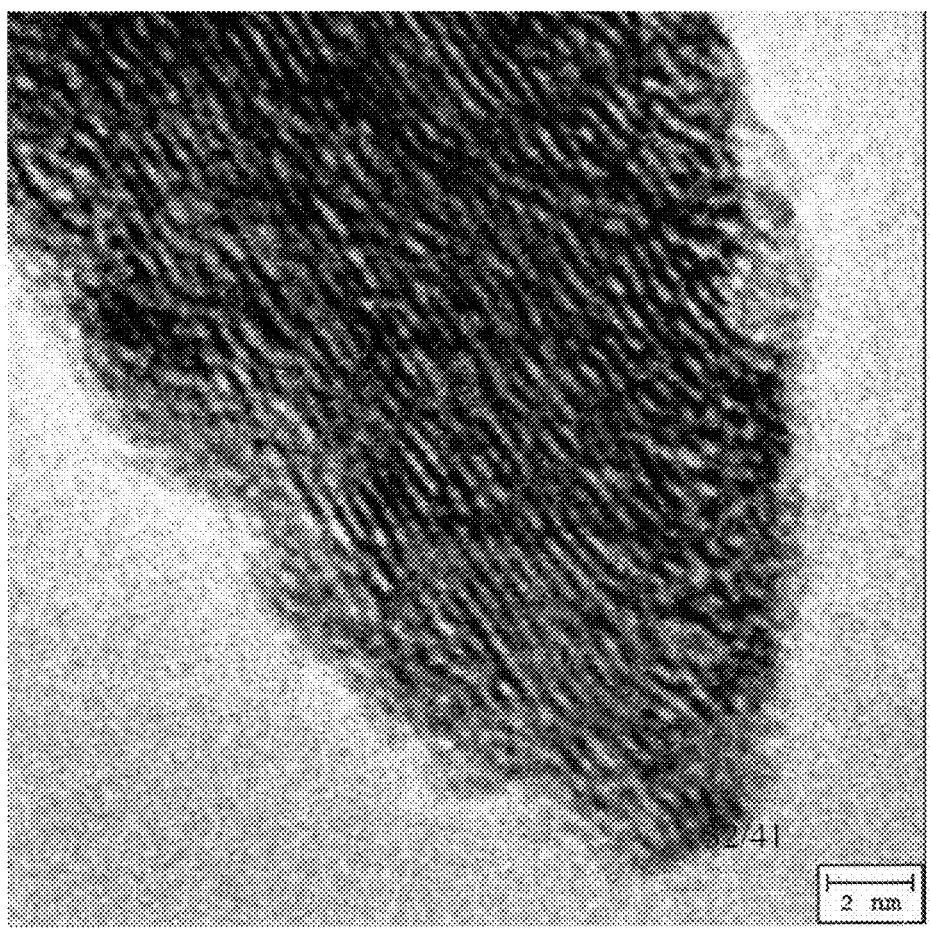
FIG. 8 is a photo illustrating the graphene layer analyzed by Transmission Electron Microscope in accordance with the embodiment of the present invention.

With reference to FIGS. 6 and 7, by using Transmission Electron Microscopy for analysis, the element of the made-up article manufactured by method of the present invention is carbon (d=0.34), and the diffraction pattern exhibits dots distribution, which means that the made-up article manufactured by method of the present invention possesses feature of crystallization. That is to say, the method for manufacturing the graphene layer possesses sufficient energies so that carbon atoms can be arranged in regular pattern. With reference to FIG. 8 illustrating an analysis diagram by use of Transmission Electron Microscopy, it is realized that the made-up article manufactured by method of the present invention exhibits an ordered arrangement.

While this invention has been particularly illustrated and described in detail with respect to the preferred embodiment thereof, it will be clearly understood by those skilled in the art that it is not limited to the specific features and describes and various modifications and changes in form and details may be made without departing from the spirit and scope of this invention.

What is claimed is:

1. A method for manufacturing a graphene layer includes:
   performing a sputtering process to form a graphite layer on a substrate; and
   performing a lithography process on the graphite layer for thinning the graphite layer and thereafter making the graphite layer thinned to become a graphene layer,
   wherein in the lithography process, the graphite layer is thinned by an ion source to make part of the graphite layer stripped from the graphite layer to make the graphite layer thinned to become the graphene layer, and
   wherein the voltage of the ion source for thinning the graphite layer ranges from 0.5 to 1.2 KV, the illuminating time for thinning the graphite layer ranges from 2 to 7 minutes, and the gas flow rate for thinning the graphite layer ranges from 20 to 35 SCCM.

2. The method for manufacturing a graphene layer in accordance with claim 1 further includes performing a washing step and a drying step prior to performing the sputtering process.

3. The method for manufacturing a graphene layer in accordance with claim 2, wherein the washing step includes providing an ultrasonic oscillation alkaline-water bath, heating the ultrasonic oscillation alkaline-water bath and making the substrate disposed into the ultrasonic oscillation alkaline-water bath, and the drying step includes placing the substrate into an oven and baking the substrate after the washing step is performed.

4. The method for manufacturing a graphene layer in accordance with claim 3, wherein the heating temperature of the ultrasonic oscillation alkaline-water bath is not less than 100 Celsius degrees, and the time for the substrate to place in the ultrasonic oscillation alkaline-water bath is not less than one hour.

5. The method for manufacturing a graphene layer in accordance with claim 1, wherein the sputtering process is performed by a sputter having a vacuum cavity, wherein a graphite target and the substrate are disposed in the vacuum cavity, and a reactive gas is provided within the vacuum cavity to perform the sputtering process.

6. The method for manufacturing a graphene layer in accordance with claim 5 includes a gas discharging step after performing the sputtering process, and the gas discharging step is to discharge the reactive gas outwardly from the vacuum cavity.

7. The method for manufacturing a graphene layer in accordance with claim 5 further includes a ventilation step before performing the lithography process, wherein the ventilation step is to ventilate an argon gas into the vacuum cavity.

8. The method for manufacturing a graphene layer in accordance with claim 1, wherein the process temperature in the sputtering process is not larger than 250 Celsius degrees.

* * * * *